United States Patent [19]

Fogg

[11] 4,427,271
[45] Jan. 24, 1984

[54] GASKETS FOR THIN GLASS LENSES MOUNTED IN OPHTHALMIC FRAMES

[75] Inventor: C. Davis Fogg, Rochester, N.Y.

[73] Assignee: Bausch & Lomb Incorporated, Rochester, N.Y.

[21] Appl. No.: 254,562

[22] Filed: Apr. 15, 1981

[51] Int. Cl.³ .............................................. G02C 5/00
[52] U.S. Cl. .................................... 351/154; 351/166; 351/178
[58] Field of Search ............... 351/154, 166, 174, 178; 29/447; 264/2.2, DIG. 71

[56] References Cited

U.S. PATENT DOCUMENTS

| | | | |
|---|---|---|---|
| 1,785,929 | 12/1930 | Bouchard | 351/154 |
| 2,419,648 | 4/1947 | Koontz | 29/447 |
| 3,243,249 | 3/1966 | Lissac | 351/154 |

Primary Examiner—Bruce Y. Arnold
Assistant Examiner—P. M. Drierzynski
Attorney, Agent, or Firm—Bernard D. Bogdon; John S. Norton

[57] ABSTRACT

A technique is presented for increasing the effective strength and impact resistance of mounted, finished, edged and strengthened ophthalmic glass lenses and particularly those which are relatively thin and pre-strengthened chemically. This is accomplished by the incorporation of material preferably applied to the edge of the lens such that the material cushions a relatively thin eyeglass lens when mounted in an eyeglass frame. The elastomeric material is selected to have high strength and low modulus properties. One particular group of materials meeting these requirements is known as heat shrinkable material. This material is preferably applied to the edge of a lens in the form of a gasket.

4 Claims, 9 Drawing Figures

IMPACT RESISTANCE OF PLANO SUNGLASSES

| METAL FRAME TYPE | I | I | I |
|---|---|---|---|
| LENS TYPE: | A | B | C |
| GLASS | G-15™ | XDF II™ BROWN | XDF II™ BROWN |
| GRADIENT | — | BROWN | BROWN |
| THICKNESS | 2.2 | 1.6 | 1.6 |
| TEMPER | AIR | CHEM | CHEM |
| LENS RIM COAT | NONE | NONE | NBR 0.1 (mm) |
| IMPACT RESISTANCE | | | |
| MEAN | 105 | 71 | 107 |
| STD. DEV. | ±27 | ±17 | ±22 |
| MIN. | 56 | ≤38 | 62 |
| MAX. | 164 | 130 | 156 |
| SAMPLE SIZE | 100 | 100 | 50 |
| CUMUL. FAILURE (%) | | | |
| ≤50" | 0 | 9 | 0 |
| ≤60" | 1 | 26 | 0 |
| ≤70" | 15 | 51 | 8 |
| ≤80" | 23 | 69 | 10 |
| ≤100" | 46 | 96 | 46 |
| ≤120" | 68 | 99 | 72 |
| ≤140" | 87 | 100 | 90 |
| ≤160" | 99 | | 100 |
| ≤180" | 100 | | |

FIG. 4

EYE INJURY HAZARD INDEX

| METAL FRAME TYPE | VARIOUS | | | |
|---|---|---|---|---|
| LENS | 2.2(mm) AIRTEMP | 1.6(mm) CHEM TEMP | | |
| LENS RIM COAT | NONE | SILICONE EYE WIRE | TAPES, ETC ON LENS | NBR ON LENS |
| IMPACT RESISTANCE | | | | |
|   MEAN | 110 | 85 | 89 | 107 |
|   STD. DEV. | ±24 | ±17 | ±20 | ±22 |
|   MIN. | 56 | 40 | 51 | 62 |
|   MAX. | 171 | 131 | 148 | 156 |
| SAMPLE SIZE | 199 | 140 | 35 | 50 |
| F FAILURES | | | | |
|   MEAN | 126 | 94 | 148 | N.A. |
|   STD. DEV. | ±19 | ±18 | — | N.A. |
| % F FAILURES | 28 | 15 | 1 | 0 |
| HAZARD INDEX | | | | |
|   H | 0.50 | 0.38 | 0.02 | 0 |
|   $H/H_{2.2(mm)}$ | 1.00 | 0.76 | 0.04 | 0 |

FIG. 5

GASKETS FOR THIN GLASS LENSES MOUNTED IN OPHTHALMIC FRAMES

BACKGROUND OF THE INVENTION

1. Field of the Invention:

This invention relates to apparatus and techniques for improving the impact resistance of relatively thin ophthalmic lenses and more particularly to improving the impact resistance of thin ophthalmic lenses carried within an eyeglass frame and in particular those lenses which have been chemically strengthened.

2. Brief Description of the Prior Art:

In approximately 1972 the U.S. Government identified a need for regulating the strength characteristics of ophthalmic lenses. It adopted standards, which at that time were already in use in the industry by many reputable lens manufacturers, ophthalmic laboratories and practitioners diagnosing, prescribing and filling patient requirements for opthalmic eyeglass wear. The standards in use are included in the *American National Standard Requirements for First Quality Prescription Ophthalmic Lenses* (ANSI Z 80.1) and presently ophthalmic eyeglass lenses are manufactured to meet those standards.

In addition, manufacturers have always of necessity been concerned about the yield of their manufacturing processes and the quality of their product. Numerous efforts have been made to minimize and control the amount of breakage and damage in the manufacture and subsequent assembly of lenses to eyeglass frames. Improved handling techniques have been incorporated, as have changes to either the eyeglass lens or the frame in which it is being incorporated in order to improve the yield and the process of filling customers' prescriptions and needs. All this has been done while still attending to the consumer's style and fashion demands.

Efforts in these directions to address the improved quality question are evident, for example, from the disclosures in the following discussed patents. In U.S. Pat. No. 1,177,367, issued in 1916, it is disclosed that non-metallic rims, having popularity at that time, were susceptible to fracture under shock and strain. Therefore, consideration was given to provide a metal support on the outside of non-metallic material used in mounting lenses. In that particular case, the concern was for providing strength to the non-metallic part of the frame and not the lens. Likewise, in U.S. Pat. No. 1,241,716, issued in 1917, similar considerations were given but with respect to facilitating assembly of the lens to or separation from the non-metallic materials. In 1929, U.S. Pat. No. 1,704,232 identified a cushion incorporated to protect the lenses, when the frame is dropped. In this particular situation the problem being addressed is one of shock to the lens through a collateral impact provided upon the frame or ophthalmic mounting.

In 1930 U.S. Pat. No. 1,785,929 addressed a similar problem and pointed out the importance of providing a supporting metallic frame when using a non-metallic rim included for ornamental appearance. There the combination of the two provided for marketing of the frame to practitioners without any lenses being included. The structural combination provided a unitary piece. In 1935 concern over difficulties in loose lenses in the frame was addressed by the industry. This problem was discussed in U.S. Pat. No. 1,995,617 wherein a lining made of cellulose composition in the form of a strip gasket was utilized. The gasket was shaped with a cross-section to fit the lens edge and inherently curved to encompass the len's outer periphery. This concept allegedly had the flexibility of being used for different size lenses and shapes.

In 1940 U.S. Pat. No. 2,221,736 addressed the problem of mounting lenses in a rim, such that differences in sizes of the rim due to manufacturing inconsistencies or expansion or contraction because of heat changes will be readily absorbed and not transferred to a lens within the rim. The specification stated that the lens when bound and in position in the rim may break by reason of such changes in size and pressure developed by contraction and expansion. Disclosed is a plano flat lens having a uniform V-shape edge formation for the application of a rubber latex material thereto prior to the lens being mounted within the metal rim. It is presumed that natural rubber latex was under consideration. This presumption is based on, for example, G. R. Vila's statement in his article entitled "Types of Latex" at page 263 of *The Vanderbilt Rubber Handbook*, Edited by S. S. Rogers, Ninth Edition 1948, published by R. T. Vanderbilt Co., New York, New York, wherein he states: "Prior to World War II the latex technologist was limited for the most part to one material—Hevea latex—either normal, centrifugal or creamed. Today, in addition to Hevea, a variety of synthetics are available, . . . ". The patent describes tightening of the lens by means of the end pieces such that there is a yieldingly bind of the lens when in position by the lens edge coating. In this way, contraction and expansion is suggested to be accommodated by reason of the coating.

Circa 1945 ophthalmic eyeglass lenses and frames that included only partial encompassing of the lens were popular. However, the lenses were still subject to breakage and one solution for lessening such breakage was disclosed in U.S. Pat. No. 2,387,789 wherein a band of plastic material, suggested to be invisible, was incorporated about the contour edges of the lens which also thereby protected the lens against chipping should the lens be struck at its edge.

With the advent of more modern eyeglass frame configurations the mounting of the eyeglass lenses into such frames became more difficult. Therefore, in order to more positively secure lenses in frames, techniques such as those in U.S. Pat. No. 2,914,986 were employed. In that patent a gasket material, for example, was incorporated into a metal frame to improve the seating of the lens regardless of the outside peripheral contour of a lens defined by concave and convex sides and regardless of the irregularities or inaccuracies in the periphery edge cross section of the lens after being ground to mount within the frame. In addition, the resilient liner allegedly provided for stable retention of the lens in the frame regardless of shock and vibration to which the frame might be subjected. Further, the liner within the metal mounting compensated for unequal compression caused by improper edging of the lens or misfitting of the lens to the mounting. This patent suggested that its inventive contribution minimized lens breakage during the lens insertion and fitting operation.

The concern for improving strength capabilities of the combination frame and lens has continued into the present era as illustrated, for example, in U.K. Patent Specification 1,566,876 published May 8, 1980. Here chemically strengthened eyeglass lenses were being subsequently cut and edged, followed by mounting into ophthalmic frames. The disclosed process provided for preventing a significant decrease in the impact resistance of the unmounted lens due to the removal of the compression layer by edging subsequent to the chemically strengthening. This was accomplished by providing a polymer coating, subsequently polymerized, on the edge surface. This coating is alleged to compensate for the decrease in impact resistance which occurs during the cutting and edging of such a chemically strengthened lens. Further, myoptic rings which occur in strong minus prescriptions for such lenses are reduced.

The glass industry most recently has embarked on an era of new glass materials for the manufacture of eyeglass lenses which materials have demonstrated many improved optical and cosmetic qualities including having photochromic properties readily suitable for gradient tinting and further these glasses combined with strengthening by chemical tempering are suitable for making thinner lenses. Natural concern has arisen over the relative strength of such materials particularly when made in the form of eyeglass lenses. To evaluate these properties, tests have been conducted utilizing equipment standard in the industry and manufactured in accordance with ANSI Z 87.1-1968 entitled *U.S.A. Standard Practice for Occupational and Educational Eye and Face Protection,* dated Sept. 18, 1968 and the FDA Statement of Policy, Section 3.84 entitled *Use of Impact Resistance Lenses in Eyeglasses and Sunglasses,* as printed in the Federal Register of Feb. 2, 1972.

As a standard to make a comparison during the development of this invention, 2.2 millimeter thick air tempered strengthened lenses were compared with 1.6 millimeter thick chemically tempered strengthened lenses. The lenses of both thicknesses were of similar material and shape, which shape is commonly known in the industry as an aviator shaped lens. Both groups of lenses had passed the 50 inch drop ball test according to the FDA Policy Statement of Feb. 2, 1972, prior to the lenses being mounted in the frames. Tests carried out on lenses in frames included the free fall impact of a $\frac{5}{8}$ inch diameter steel ball at 50 and 70 inches. The goggles were supported on a fixture specified in ANSI Z 80.7 for testing lens retention under impact. The two sets of lenses when tested, were mounted in identical metal eyeglass frames. Although there is a clear indication that the failure rate of the thinner lenses in metal frames was higher when impacted by the steel ball from 50 inches, the results were pronounced and higher when impacted by the ball from 70 inches. The mean impact resistance measured in terms of inches of free fall height of a $\frac{5}{8}''$ diameter steel ball causing lens fracture of the thinner lens in metal frames for a given representative sample was 79 inches with a standard deviation of approximately ±22 inches whereas the mean impact resistance of the thicker lens in metal frames for a similar representative sample was 101 inches with a standard deviation of approximately ±29 inches. The before stated results are representative results from a significant number of tests conducted in this comparison evaluation.

SUMMARY OF THE INVENTION

Development of the present invention was included in a lens impact resistance study being conducted by Emil W. Deeg. Its development was carried out in concert with a companion invention by Emil W. Deeg which invention is the subject of a patent application entitled "Mounting of Thin Glass Lenses in Ophthalmic Frames", Ser. No. 254,345, concurrently filed with the present invention.

In the Deeg study, lenses which were fractured as a result of these tests in metal frames, when examined, were found to exhibit Hertzian type fracture, heretofore not fully appreciated as being a factor in the study of safety considerations in eyeglass lenses. The prior thinking centered about the lens being broken as if caused by a static load.

Hertzian type fractures are more fully discussed in the hereinbefore mentioned Deeg patent application. An article entitled "Impact of Small Steel Spheres on Glass Surfaces" by C. G. Knight, M. V. Swain and M. M. Chaudri published in *The Journal of Materials Science,* Vol. 12 (1977), pages 1573–1586 describes their characteristics. Hertz cracks are observed on rigid, brittle materials such as relatively thick blocks of glass. They do not always cause total mechanical failure of the tested item.

Incorporating a lens into a confined arrangement, particularly a metal frame, increases the stiffness of the lens and does not permit utilization of the high degree of flexibility of thin chemically tempered lenses. Mounting such lenses in a metal frame provided the condition for promoting Hertzian type fractures. This is more fully described hereinafter with respect to FIG. 1. This discovery of the Hertzian effect makes it fairly evident that strength and safety testing of eyeglass lenses prior to their mounting in eyeglass frames is only one stage of review necessary to determine the ultimate measure of safety provided to the wearer of a lens.

With the advent of improved glass materials and particularly those which are relatively thin, and in response to consumer demand for more lightweight ophthalmic and particularly sunglass eyeglasses, there is a continuing need to strive to provide maximum strength capabilities for consumer protection. This invention not only provides minimum industry acceptable strength levels, but improves upon the effective strength aspects of such glass lenses. This invention is better appreciated by an understanding of the results of the hereinbefore mentioned Deeg study. Deeg discovered that rigidly mounted eyeglass lenses, particularly those which are relatively thin, when impacted by a projectile, moving at a velocity above the critical velocity required for initiation of Hertzian type surface cracks can fracture, at values of the kinetic energy of the impacting missile, which are below the values required for causing fracture of the freely supported lens, according to the impact test required by The FDA Policy Statement of Feb. 2, 1972.

FIG. 1, through its many views, illustrates the conditions created by the loading and unloading of a missile against a lens. In FIG. 1 at view A (FIG. 1A) there is illustrated a missile 10 traveling in the direction of arrow 12 to impact upon a lens surface 14. FIG. 1B shows the missile 10 contacting the lens surface 14. FIG. 1C shows the missile 10 compressed against the lens surface 14 and shows resultant Hertzian cone cracks exemplarily illustrated by fracture lines 16 and 18. Upon full impact of the missile 10 against the lens surface 14, as shown in FIG. 1D, a median crack 20 is formed.

FIGS. 1A–1D illustrate the load being imposed upon the glass lens 14. Beginning with FIG. 1E through FIGS. 1F and 1G, an unloading process takes place with the missile 10 traveling in the direction of arrow 21. By the time of complete unloading, of the missile at FIG. 1G it will be noted that lateral cracks, illustrated by fracture lines 22 and 24 have been created. This is illustrative of Hertzian type failure. The penetration of the Hertz cracks in any one of the stages illustrated in FIGS. 1C–1H are made more evident by the illustration of FIG. 1H where the back surface 26 of the lens is also illustrated. Between surfaces 14 and 26 there are diagrammed two imaginary lines 28 and 30, both of which represent the boundaries of the compression zone of a thermally or chemically strengthened glass from surfaces 14 and 26, respectively. The area between the compression zones or between lines 28 and 30 comprises a tension zone. Brittle materials, such as glasses, are susceptible to fracture under tension. It will be noted that the Hertzian cone cracks 16 and 18 both extend, as does the median crack 20, into the tension zone thus causing global failure of the sample tested.

For relatively thin eyeglass lenses, particularly those having a thickness in the range of one to two millimeters, when evaluated according to government standards and other standards acceptable in the industry under environmental conditions where the lens is not constrained about its periphery, the impact test results have been satisfactory. However, after incorporation of such lenses in eyeglass frames and particularly frames made of metal, subsequent evaluations, under conditions similar to the standardized government and industry techniques, as documented in ANSI Z 87.1, have exhibited a decrease in the effective strength of such lenses when mounted.

Further, lenses which are less than 2.0 millimeters in thickness are normally strengthened by chemical strengthening methods using an ion exchange process. The basis of one such chemical strengthening process is described in U.S. Pat. No. 3,218,220. The process for chemically strengthening glass is a function of its chemical composition. Techniques suitable for the glass materials utilized in the development of this invention are well known in the art. Thermal tempering by air quenching techniques commonly used in the ophthalmic industry is not possible generally for such thin lenses, because such lenses have low mass and thus insufficient heat retaining capacity to accomplish strengthening.

Fracture of a lens under impact usually presents a condition such that, when an eyeglass lens is impacted by a projectile, lens fragments are quite likely to be projected inwardly toward the wearer of the eyeglass lens. Obviously, this can cause serious injury to the wearer.

The present invention provides a control to lessen the likelihood of fracture, but even in the event of fracture the fractured lens material going to the eye region of the wearer is lessened. The invention provides for preferably applying directly to the glass of such relatively thin lenses, which have been chemically strengthened, a cushion at the edge of the glass which interfaces between the eyeglass lens material and the structure of the eyeglass frame which surrounds the lens in whole or in part. To accomplish application of the cushion to the edge, the edge need not be uniform in cross section about the periphery of the lens. The cushion serves two purposes. The first purpose is to permit the lens, particularly a thin chemtempered glass lens, to yield in an elastic, membrane like-fashion to the force exerted by the impacting missile, thus reducing the likelihood for the existence of conditions required for Hertzian failure. The second purpose, is to assist in retaining lens fragments in the frame subsequent to fracture. The cushion can comprise any of a number of suitable materials which are of high strength, and have low elastic modulus. These materials are preferably disposed about the edge of the eyeglass lens before insertion of the lens into the eyeglass frame. The material can be applied to the eyeglass frame, but that practice is not preferred, primarily for economic reasons.

Application of shrinkable material including shrinkable tubing and shrinkable preforms are according to the principles of this invention.

When the invention has been employed, the fractured lens pieces tend to remain within the frame, being held in place by the cohesion of the coating between broken pieces and the adhesion of the coating to the frame. More importantly, however, the Deeg study demonstrates that Hertzian type fracture conditions having been lessened or eliminated by embodiments according to the principles of the invention, the impact resistance of the lens in a metal frame is increased and the lens fragments, after an impact fracture, are not as likely to project inwardly toward the eye of the wearer.

BRIEF DESCRIPTION OF THE DRAWINGS

FIG. 4 is an impact resistance chart comparing effective lens strength.

FIG. 5 is a safety hazard index chart comparing relative safety of lenses.

DETAILED DESCRIPTION OF THE PREFERRED EMBODIMENT

Figure 1:
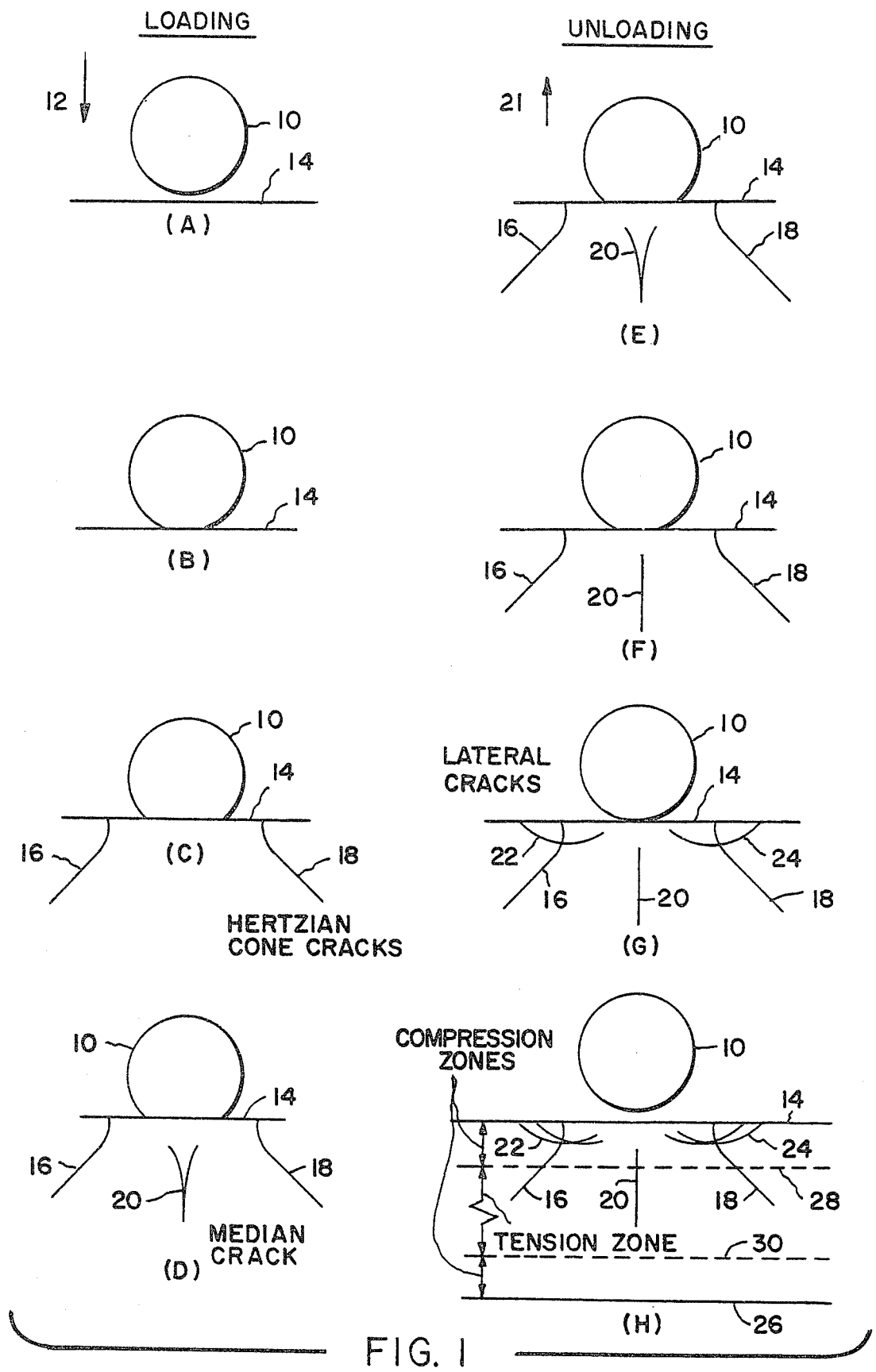
FIG. 1, comprising views A–H, illustrated Hertzian surface fracture caused by a projectile impacting a glass surface.

The hypotheses formed, as a result of the tests conducted by Deeg are that lenses, supported rigidly at their edges, fail under impact through Hertzian fracture as described with reference to FIG. 1 and that localized stress concentration caused by non-uniform clamping reduces the effective impact resistance of lenses in metal frames. These hypotheses are particularly pertinent to the relatively thin chemically strengthened lenses tested. Both hypotheses were supported by qualitative observation. The existence of conditions leading to Hertzian type fracture was confirmed by a quantitative test whereby the critical velocity of ⅝" and 1" diameter steel balls was first calculated and subsequently verified experimentally. It was observed that the dominant fracture pattern displayed fracture cracks originating at the impact area and propagating essentially in radial directions away from it. Stress concentration was observed on a polariscope where localized high strain areas were visible at the lens edge. In most of these cases, the fracture origin was found to be at the points of strain—optically observed stress concentration and the fracture pattern deviated from the radially symmetric appearance.

These observations resulted in the conclusion that any solution needed to provide for less rigid clamping of the lenses by the eyeglass frame and to provide for uniform clamping of the lenses by the eyeglass frame. Constraints on solutions to these problems were imposed. Any solution could not be overly disruptive either to established lens and frame manufacturing techniques or the process of their assembly. The present invention provides a solution which meets the requirements with the least amount of disruption of established manufacturing steps.

Prior to arriving at the inventive solution many alternatives were explored to optimize the visco-elastic properties of the lens and its support system. To solve this problem it became essential that at the maximal deflection of the lens center, when impacted by a missile, the edge of the lens be able to move freely in a radial direction. That behavior is possible if the material holding the lens has a low elastic modulus. Obviously, the frame itself might be considered for manufacture from such a material. However, from a practical standpoint, most frame materials do not have property values which provide uniform satisfactory results. This is particularly true for metal eyeglass frames where the eyewire that supports the lens is of a high modulus material ranging from approximately $11 \times 10^6$ psi to $30 \times 10^6$ psi.

To satisfy the need for increased impact resistance of relatively thin chemically strengthened glass lenses mounted in metal frames, elastomeric liners between the lens and the frame were considered. Although approximately 100 polymeric materials were originally evaluated, 16 were selected as most promising. Those materials were: natural and synthetic rubbers; flexibilized epoxy; thermo plastic elastomers (TPE); TPE polyester, TPE styrene butadiene or styrene isoprene block copolymers; polyurethane; TPE urethane; ionomers; polybutylene; high density polyethylene (HDPE); nylon 6; vinylidenechloride; fluorinated ethylene propylene copolymer (FEP); polytetrafluoroethylene (PTFE); ethylene tetrafluoroethylene copolymer (ETFE); and polyvinylidene fluoride (PVDF). Factors evaluated in making these selections involve considerations of their compression and tensile modulus strength and durability properties and the form in which the material is generally available.

Further, the thickness of such a liner is a factor in the selection of the material. It was estimated that for a glass lens of 1.6 millimeter thickness and of approximately 65 mm diameter, a radial movement of approximately 0.02 millimeters would be experienced if a static load applied to the lens center would result in fracture. Because of manufacturing considerations and the need to consider tolerance factors such as tolerance buildup, a liner thickness of 0.1 millimeters was selected to permit lens edge movement in a low modulus material with less than $0.1 \times 10^6$ psi modulus.

Figure 2:
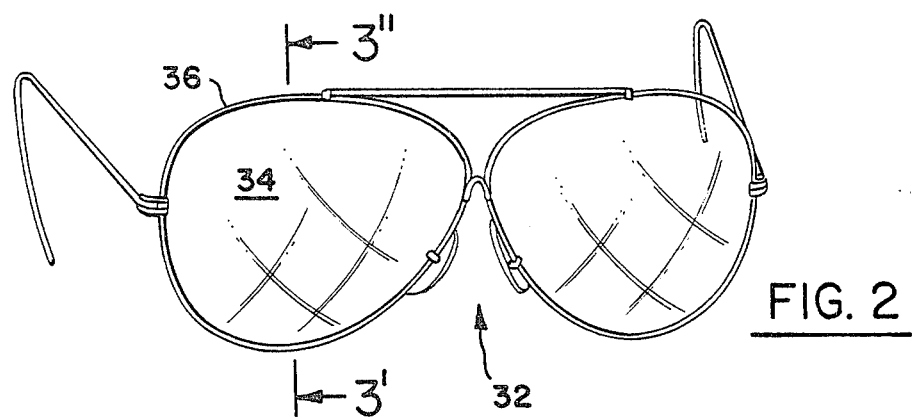
FIG. 2 is a perspective view of a metal eyeglass frame with glass lenses according to the principles of the present invention.
Figure 3:
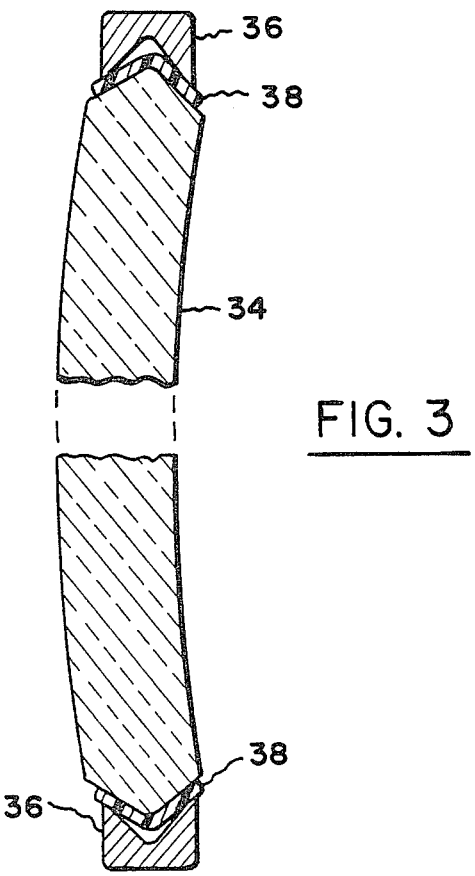
FIG. 3 is a cross-sectional view of the metal eyeglass frame and glass lens along 3'—3" of FIG. 2.

In FIG. 2 there is illustrated a metal eyeglass frame 32 which is exemplary of the type of frame extensively used in the development and evaluation of the present invention. A liner, although for cosmetic reasons not visible in the illustration of FIG. 2, provides for cushioning of a lens 34 within the metal frame 36. FIG. 3 is a cross-sectional view taken along 3'—3" of FIG. 2 showing the glass lens 34 mounted within the metal eyeglass frame 36 at the upper and bottommost portions of the lens 34. A coating 38 is illustrated as being applied to the edge portions of the lens 34 and captured between the metal frame 36 at the top and bottom edges of the lens 34. It will be appreciated that the coating is disposed about the total periphery of the lens 34. It is desirable that the coating cover no more than the edge of the lens as is illustrated and not protrude outward on either the front (convex) or back (concave) surfaces of the lens 34.

One of the 16 preselected materials, natural rubber applied in the latex form, provided satisfactory results to a limited extent. Although satisfactory in providing an increased safety level, the natural rubber demonstrated serious deficiencies, since it was not able to satisfactorily undergo normal cleaning and degreasing processes involved in the manufacture of eyeglass frame assemblies with lenses, such as sunglasses.

An alternative approach, involving the use of acrylonitrile-butadiene copolymer (NBR), eliminated the before stated manufacturing problem which existed with natural rubber. The results of lens mounted assemblies with NBR liners are summarized in the chart of FIG. 4. This chart highlights the dramatic strength with NBR. Similar results are to be expected from use of any of the 16 perselected materials. It will be appreciated that the edge coating thickness affects the cushioning effect. The higher the elastic modulus of the liner material, the thicker the coating. The trademark designation of G-15 is proprietary to Bausch & Lomb Incorporated and the trademark designation of XDF II is proprietary to Corning Glass Works.

For the 16 selected materials the tensile modulus ranges from approximately $0.1 \times 10^3$ psi for natural rubber to approximately $100 \times 10^3$ psi for nylon 6 material. To make an evaluation of each of the 16 preferred materials, a figure of merit (M) defined as the mean strength divided by the tensile modulus was derived as a measure of the most acceptable material for use in forming the liner. The higher the value of M, the more probable better results would be obtained with such material. Embodiments tested demonstrated that the frequency of failure, of the type of failure where the lens fractures and the fragments were ejected from the eyeglass frame toward the eye, hereinafter described as F, was substantially less than other spectacles considered in this study.

FIG. 5 demonstrates this superiority and shows as a measure of this improved lens/frame combination a hazard index (H) which is defined as the frequency of such failures (F) divided by the minimum impact resistance of any one tested sample in a like-group. Therefore, a low H value is desirable. Note that in FIG. 5, for the test sampling indicated, no failures occurred for the lens/frame combinations having NBR liners.

Figure 6:
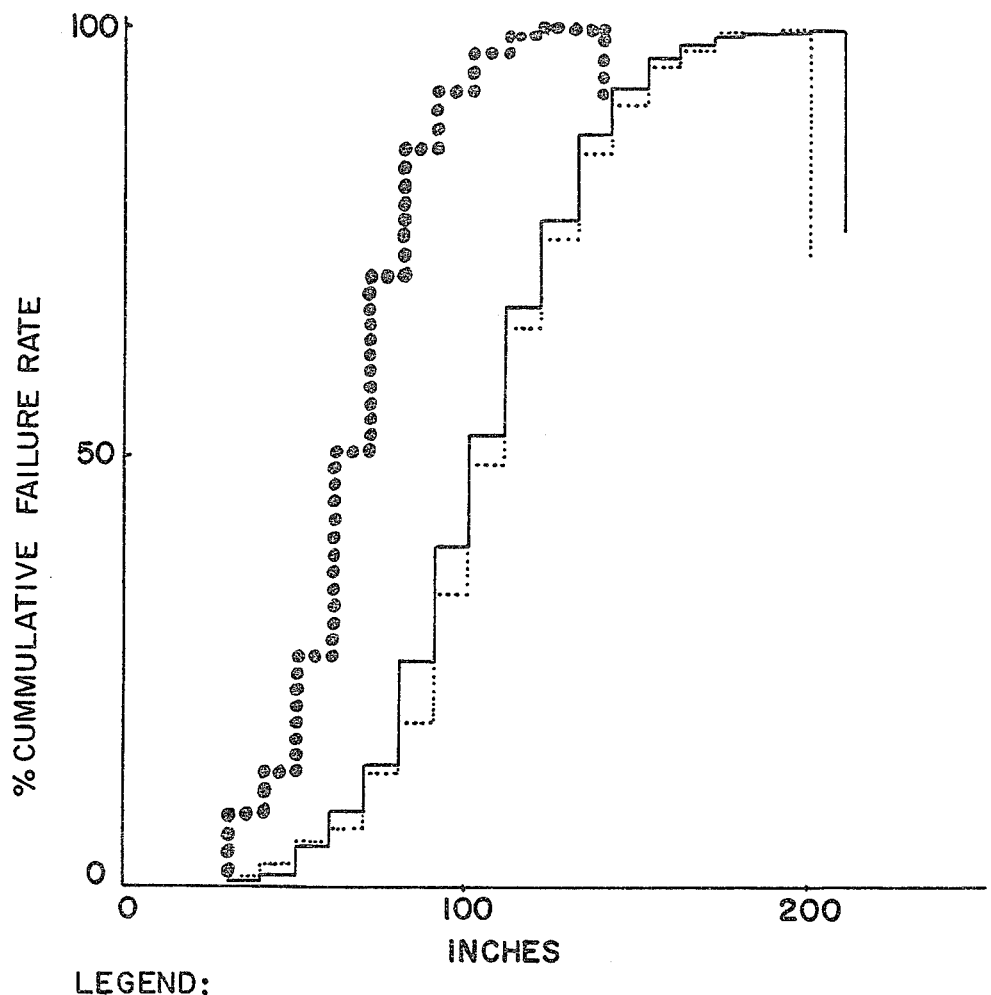
FIG. 6 is a graphical comparative illustration of cumulative failure rates.

FIG. 6 shows in graphical form cumulative failure rates determined on large numbers of lenses mounted in a variety of metal frames of different styles and materials. The lens fragment retention rate and the means impact resistance values are also listed there.

Techniques providing satisfactory commercial results and providing a significant safety improvement factor over lenses which are not treated according to the principles of this invention, include applying a gasket material to the lens made of a heat shrinkable material. Heat shrinkable materials are available in various chemical composition and are, for instance, made of polyvinylidene fluoride and polypropylene. Heat shrinkable materials are readily available in tube configuration. For this invention performs could be cut to fit about the edge of the contoured lens. Precut gaskets of this kind, however, are not easily applied and fitted to varying lens contours. They would of necessity, at the preshrunk stage, need to be approximately the size of the lens to which they are to be fitted. Difficulty would be experienced in maintaining the gasket in position during the shrinking process. Adhesives can assist at this manufacturing stage.

Figure 7:
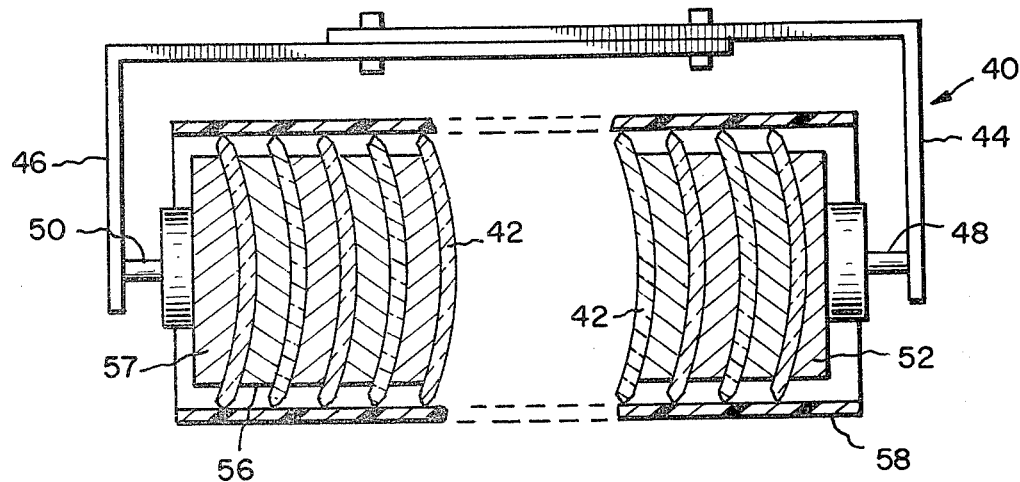
FIG. 7 illustrates a system for applying a gasket coating to the edges of lenses according to the principles of the present invention.

An alternative to individual gaskets is provided by the stacking of a plurality of lenses adequately spaced from each other and then encompassing the total stack of lenses with a heat shrinkable sleeve and subsequently subjecting the material to the heat shrinking process below the strain point of the glass. In FIG. 7 there is illustrated an apparatus for accomplishing this technique for applying such a heat shrinkable tube about a plurality of lenses. A C clamp assembly 40 is adjustable for stacks of individual lenses 42 of varying numbers. The assembly 40 comprises brackets 44 and 46 slidably engaged with each other and adaptable for loading and unloading stacks of lenses for processing to gasket each lens edge. Spring loaded pivot pins 48 and 50 are fixed to brackets 44 and 56, respectively, and fit into the compatible sockets of end pieces 52 and 54, respectively, for urging the stacked lenses together. End pieces 52 and 54 and lens spacers 56 are appropriately curved or flexible to engage and hold against the individual lenses 42 to accomplish a stable compact stack of lenses.

A heat shrinkable tube 58 is illustrated as encompassing the entire stack of lenses 42 and is shown in cross section. It is sized to adequately fit over the lens stack but fitted closely thereto. Thereafter, the stack of lenses is subjected to a heat cycle to provide for shrinking of the tube 58. The resultant stack of lenses would appear as illustrated in FIG. 8 where a corrugation effect is accomplished where the heat shrinkable material 58 is in close contact with each lens 42 at its edge and has shrunk down onto the spacer 56 between the lenses 42.

Figure 8:
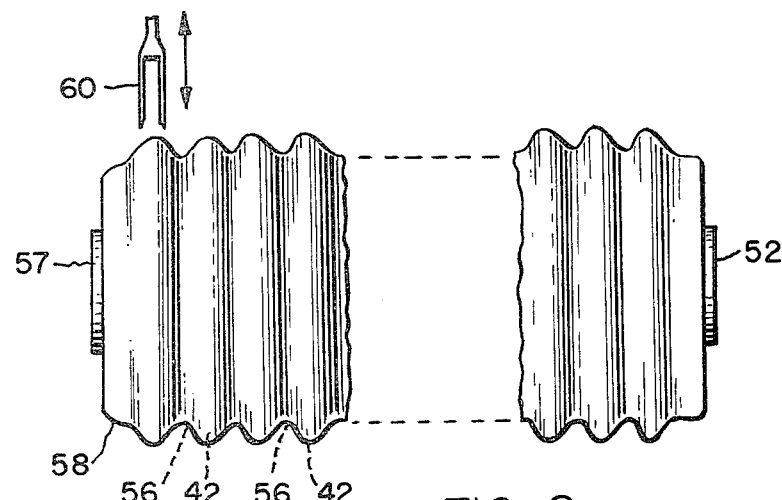
FIG. 8 illustrates a stack of lenses sheathed with a gasket material according to the principles of the present invention.
Figure 9:
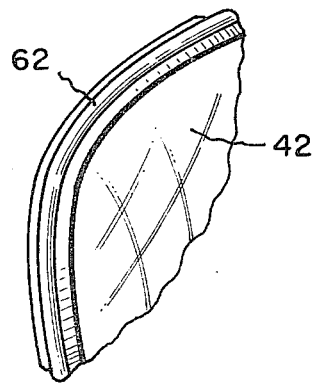
FIG. 9 is an illustration of a single lens having disposed on its edge a gasket material after undergoing procedural steps relating to the system as illustrated in FIG. 7.

In FIG. 8, schematically illustrated is a double-edged knife 60 mechanically actuated to engage each lens about its periphery to cut the lens 42 away from the lens stack with a heat shrunk gasket 62 encompassed about the edge of each lens 42 as illustrated in FIG. 8. The fit would be positive despite any unsymmetrical aspects of the lens outline or any irregularities in the edge which occur during the edging process. A suitable adhesive may also be desirable in applying the gasket in this manner.

While there have been described and preferred embodiments of this invention at the present time, it should be obvious to those skilled in the art that changes and modifications can be made thereto without departing from the spirit and scope of the invention.

It is claimed:

1. An ophthalmic lens gasket material, comprising:
a continuous loop of substantially flexible, heat shrinkable material having an initial size in an unheated state sufficient to fit over the peripheral edge of an ophthalmic lens at a first step of installation and shrinkable to a second size to closely fit about and be in, and remain in, intimate contact with the peripheral edge of the ophthalmic lens after application of sufficient heat to shrink the substantially flexible heat shrinkable material during a second manufacturing step.

2. A plurality of ophthalmic eyeglass lenses stacked to dispose the outer periphery of each lens in line with the outer periphery of each other lens in the stack and a heat shrinkable gasket material disposed about the stack of ophthalmic eyeglass lenses of a size sufficiently large enough to fit about the stack of lenses and to be in intimate contact with the periphery of each lens after being subjected to a heat shrinking process.

3. A method for forming a gasket about an ophthalmic lens, comprising the steps of:
providing an ophthalmic lens defining a peripheral edge;
applying a substantially flexible heat shrinkable material in an unheated state about the peripheral edge of the ophthalmic lens; and
applying sufficient heat to the substantially flexible heat shrinkable material to shrink it about the peripheral edge of the ophthalmic lens.

4. A method for forming a gasket about an ophthalmic lens, comprising the steps of:
providing a plurality of similarly shaped ophthalmic lenses;
stacking the plurality of ophthalmic lenses;
aligning the peripheral edges of the stacked ophthalmic lenses;
applying a heat shrinkable material about the stack of ophthalmic lenses;
heat shrinking the heat shrinkable material applied about the stack of ophthalmic lenses to provide an intimate contact between the heat shrinkable material and each ophthalmic lens; and
separating each ophthalmic lens with the applied heat shrinkable material in intimate contact therewith from the stack of ophthalmic lenses to provide ophthalmic lenses with individual gaskets about the peripheral edge of each ophthalmic lens.

* * * * *